Patented May 17, 1938

2,117,425

UNITED STATES PATENT OFFICE 2,117,425

AZO DYES

Henry Jordan and Swanie S. Rossander, Wilmington, Del., assignors to E. I. du Pont de Nemours & Company, Wilmington, Del., a corporation of Delaware No Drawing. Application July 22, 1937,
Serial No. 155,041

6 Claims. (Cl. 260—72)

This invention relates to azo dyestuffs.

In the search for new azo colors which vary from orange and brown to violet in hue, it has been difficult to find colors which had the requisite properties of stability under the conditions of use when applied to cellulose, within which term are included the well-known celluloses and regenerated cellulose.

As a first step in the preparation of such dyes it is an object of the invention to discover components being in themselves direct dyes which have high affinity for the fiber, can be applied to it from an aqueous medium, and which can be diazotized thereon and coupled to components which will produce on the fibers colors of the desired range.

The objects of the invention are accomplished, generally speaking, by making compounds of the formula:

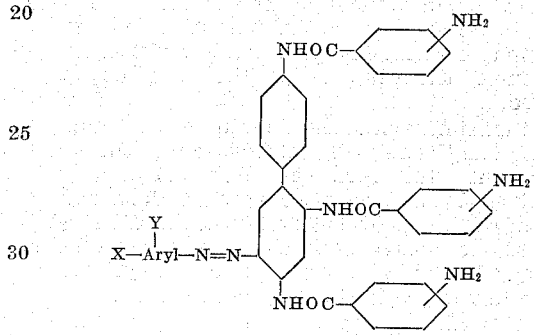

in which X is one of a group consisting of hydrogen,

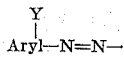

and

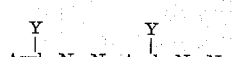

Y is at least one of a group consisting of hydrogen, halogen, alkyl, alkoxy, hydroxy, secondary amino, tertiary amino, carboxy, and sulfonic acid, and aryl has a single nucleus from the group consisting of benzene and naphthalene, and applying them to cellulose from an aqueous medium. The objects of the invention are also accomplished to a degree by the means and methods and the details thereof as more fully hereinafter set forth. In the carrying out of the process a diazotized arylamine having 2-amino-benzidine as an end component is condensed with a nitro-aroyl-halide and the resulting product is reduced. The preferred members of this class of colors contains water-solubilizing groups such as carboxylic and sulfonic acid. Frequently two of these groups are present although not necessarily in the same nucleus.

The following examples are illustrative of the method of preparing the compounds.

Example I

Dissolve 4.3 parts of metanilic acid in 75 parts of water and 12.5 parts of 2 normal sodium carbonate solution. Cool to 5° C. by adding ice and add 6.5 parts of 10 normal hydrochloric acid. Immediately add 12.5 parts of 2 normal sodium nitrite solution. Hold to a ten minute end-point with excess sodium nitrite.

Dissolve 5.5 parts of 1,6-Cleve's acid (alpha-naphthyl-amine-6-sulfonic acid) in 50 parts of water and 12.5 parts of 2 normal sodium carbonate solution. Add 25 parts of 2 normal sodium acetate solution. Make acid to litmus with acetic acid. Add to the above diazo at 5 to 10° C. Stir the coupling over night, allowing it to come to room temperature. Make alkaline to Brilliant Yellow paper with sodium carbonate. Tests should show the absence of 1,6-Cleve's acid and metanilic acid diazo. Cool to 10° C. and add 7 parts of 10 normal hydrochloric acid and 12.5 parts of 2 normal sodium nitrite solution. Stir the diazo one-half hour at 10 to 15° C. with an excess of nitrite. Make the diazo neutral to Congo by adding 30 parts of 2 normal sodium acetate solution.

Dissolve 7.7 parts of 2-amino-benzidine as the tri-hydrochloride in 50 parts of water. Add to the above neutral diazo. Stir 4 hours at 26 to 28° C. Heat to 70° C. and filter acid to Congo. Dissolve the residue in 1000 parts of water and 50 parts of 2 normal sodium carbonate solution. Heat to 90° C. Add para-nitro-benzoyl-chloride (27.6 parts of 100% as a 20% solution in carbon tetrachloride) and soda ash intermittently, maintaining light alkalinity on Brilliant Yellow paper at all times until the condensation is complete. Stir one hour longer at 90° C. Filter from a fairly clear rim. Slurry the residue with 1500 parts of water and 25 parts of 2 normal sodium carbonate solution. Heat to 85 to 90° C. Add 25 parts of sodium disulfide. Hold a distinct excess test of disulfide for two to three hours at 90° C. Add 5% sodium chloride and filter. Dry in an oven at 90–100° C. The dried product is a dark powder. Its probable formula is:

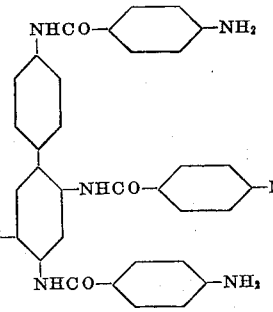

Example II

Dissolve 8.6 parts of sulfanilic acid in 100 parts of water and 25 parts of 2 normal sodium carbonate. Cool to 5 to 10° C. Add 12.5 parts of 10 normal hydrochloric acid, followed by 25 parts 2 normal sodium nitrite. Hold a 15 minute endpoint with slight excess of sodium nitrite.

Dissolve 15.4 parts of 2-amino-benzidine-trihydrochloride in 50 parts of water. Add to the above diazo. Make neutral to Congo with 50 parts 2 normal sodium acetate. Stir the coupling over night. Heat to 70° C., make acid to Congo and filter. Paste the residue with 6 parts of dry sodium carbonate. Take up the residue and dissolve in 1500 parts of water. Condense at 90° C. with 55 parts of para-nitro-benzoyl-chloride. Add 10% sodium chloride, and filter.

Dissolve the residue in 1500 parts of water and 25 parts normal sodium carbonate. Heat to 90° C. Add 50 parts of sodium disulfide. Maintain a temperature of 90° C. with an excess of disulfide for two hours. Add 10% sodium chloride and filter. Dry in an oven at 90–100° C. The dried product is an orange powder, soluble in water. The probable formula of the dye is:

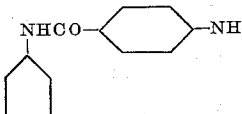
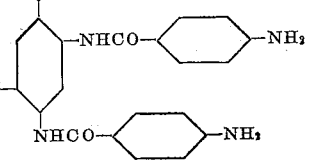

Following are tabulated representative products of the invention, and certain properties of the direct and developed dyeings on cotton. 2-amino-benzidine is arbitrarily abbreviated "Am Bz". The expressions MAB and PAB are abbreviations for meta-amino-benzoyl and para-amino-benzoyl, respectively. For example, (2-naphthylamine-6,8-disulfonic acid→alpha naphthylamine→Am Bz) (MAB)₃ is the product, obtained by the sequence of operations, involving (a) coupling alpha naphthylamine to diazotized 2-naphthylamine-6,8-disulfonic acid (b) diazotizing the product of (a) and coupling to 2-aminobenzidine (c) condensing (b) with m-nitro-benzoyl-chloride (d) reducing the three nitro groups of (c). The products are characterized by their substantivity to cotton and regenerated cellulose, and by their outstanding fastness to washing and usually by the excellent discharge properties of their developed dyeings.

| Ex. | Composition of product | Color of dyeing |
|---|---|---|
| 3 | Sulfanilic acid→2-amino-5-hydroxy-naphthalene-7-sulfonic acid→2-amino-benzidine (PAB)₃. | Bordeaux. |
| 4 | Metanilic acid→alpha-naphthylamine-6-sulfonic acid→2-amino-benzidine (PAB)₃. | Dull violet. |
| 5 | 4-Amino-azobenzene-4'-sodium sulfonate→2-amino-benzidine (PAB)₃. | Weak brownish orange. |
| 6 | 2-Naphthylamine-6, 8-disulfonic acid→2-amino-benzidine (PAB)₃. | Bright orange. |
| 7 | 2-Naphthylamine-6, 8-disulfonic acid→cresidine →2-amino-benzidine (PAB)₃. | Brown. |
| 8 | 8-Amino-1-naphthol-3, 6-disulfonic acid→cresidine →2-amino-benzidine (PAB)₃. | Dull violet. |
| 9 | Sulfanilic acid→2-amino-benzidine (PAB)₃. | Yellow orange. |
| 10 | 2-Naphthylamine-6, 8-disulfonic acid→aniline →2-amino-benzidine (PAB)₃. | Brown. |
| 11 | 2-Naphthylamine-6, 8-disulfonic acid→meta-toluidine→meta-toluidine→2-amino-benzidine (PAB)₃. | Do. |

Each aryl nucleus of the coupling compound may contain one or more substituents from the group halogen, alkyl, alkoxy, hydroxy, secondary or tertiary amino, carboxy, and sulfonic acid, but they should be used sparingly in the 2-amino-benzidine group because the presence of a negative group may partially hinder the condensation. Of course, the coupling position may not be blocked.

The maximum number of amino-aroyl groups, that can be theoretically introduced into the end component is three. At least one of our products contained this number of such groups. The presence of other substituent groups in the diphenyl nucleus may partially hinder the introduction of such groups. It is recognized that the primary object in the preparation of the most preferred dyes is to introduce the maximum possible number of nitro-aroyl groups, prior to the reduction of the nitro groups.

In the preferred form of the invention the middle components have single rings from the benzene and naphthalene series and are coupled to adjacent azo groups in para positions. The amino-naphthols in which the coupling position is ortho or para to the hydroxy group are particularly noteworthy.

The products are water-soluble dyes having exceptional substantivity to cellulose. The polyazo derivatives are particularly desirable. In general, the 2-amino-benzidine component is to be kept free of carboxylic and sulfonic acid groups although this prohibition is not absolute. Not only are the compounds dyes in themselves but, when applied to the fiber, they may be diazotized and coupled to suitable components.

As many apparently widely different embodiments of this invention may be made without departing from the spirit and scope thereof, it is to be understood that we do not limit ourselves to the specific embodiments thereof except as defined in the appended claims.

We claim:

1. A compound represented by the formula:

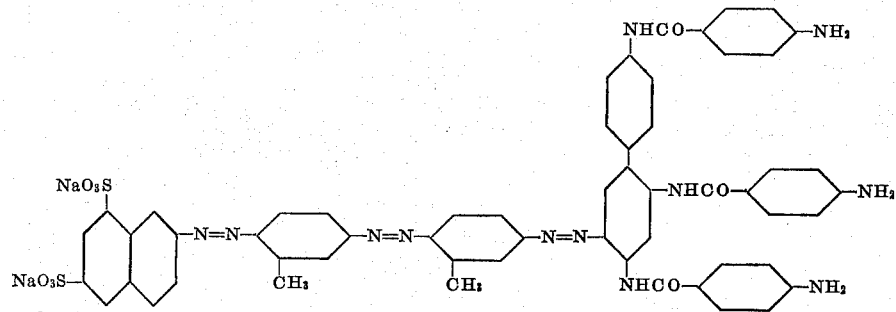

2. A compound represented by the formula:

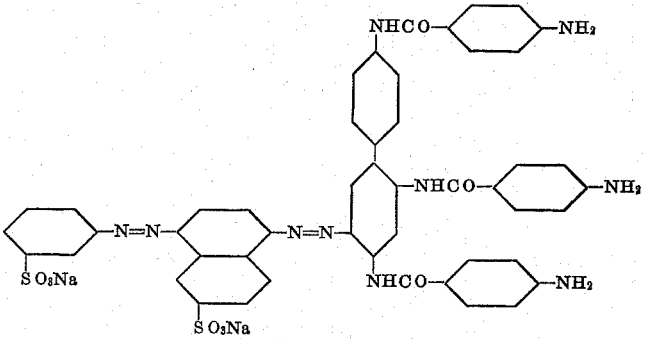

3. A compound represented by the formula:

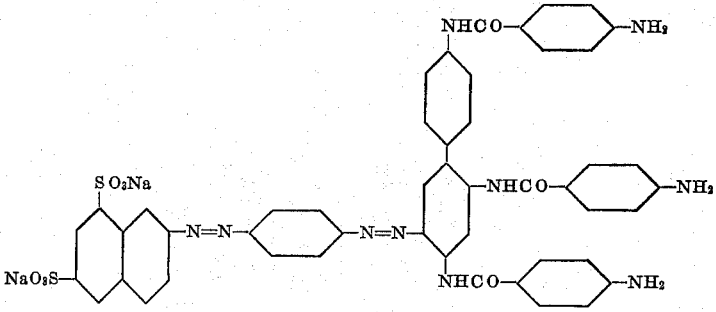

4. A compound represented by the formula:

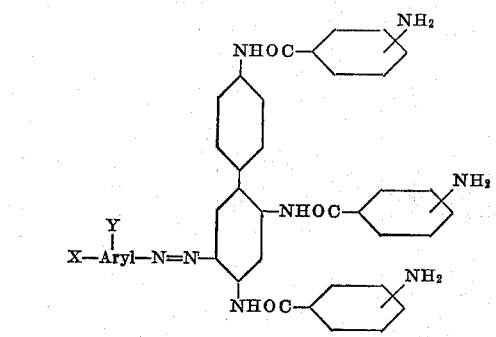

in which X is one of a group consisting of hydrogen,

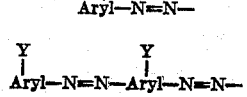

and $$\overset{Y}{\underset{|}{\text{Aryl}}}-N=N-\overset{Y}{\underset{|}{\text{Aryl}}}-N=N-$$

Y is at least one of a group consisting of hydrogen, halogen, alkyl, alkoxy, hydroxy, secondary amino, tertiary amino, carboxy, and sulfonic acid, and aryl has a single nucleus from the group consisting of benzene and naphthalene.

5. The process which comprises diazotizing metanilic acid and coupling it to 1,6-Cleve's acid, diazotizing the product and coupling it to 2-amino-benzidine, condensing the product with para-nitro-benzoyl chloride, reducing the nitro groups, and isolating the product.

6. The process which comprises diazotizing an aromatic compound having a free amino group, coupling it to 2-amino-benzidine, condensing the product with para-nitro-benzoyl, chloride, and reducing.

HENRY JORDAN.
SWANIE S. ROSSANDER.